(12) United States Patent
Jung et al.

(10) Patent No.: US 9,326,223 B2
(45) Date of Patent: Apr. 26, 2016

(54) METHOD AND APPARATUS FOR SYSTEM ACCESS

(75) Inventors: Jung Soo Jung, Seongnam-si (KR); Soeng-Hun Kim, Yongin-si (KR); Kyeong In Jeong, Suwon-si (KR); Sang Bum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 13/704,067

(22) PCT Filed: Jun. 28, 2011

(86) PCT No.: PCT/KR2011/004705
§ 371 (c)(1),
(2), (4) Date: Dec. 13, 2012

(87) PCT Pub. No.: WO2012/002699
PCT Pub. Date: Jan. 5, 2012

(65) Prior Publication Data
US 2013/0184021 A1 Jul. 18, 2013

(30) Foreign Application Priority Data
Jun. 28, 2010 (KR) ........................ 10-2010-0061161

(51) Int. Cl.
*H04W 48/16* (2009.01)
*H04W 74/08* (2009.01)
*H04W 4/00* (2009.01)

(52) U.S. Cl.
CPC ............ *H04W 48/16* (2013.01); *H04W 74/085* (2013.01); *H04W 4/005* (2013.01)

(58) Field of Classification Search
CPC ......... G06F 12/0802; H04W 74/0833; H04W 48/16
See application file for complete search history.

(56) References Cited

U.S. PATENT DOCUMENTS

| 8,014,349 | B2 * | 9/2011 | Kwon | ................... H04W 72/04 370/329 |
| 2006/0121855 | A1 * | 6/2006 | Dillon | ................... H04W 24/00 455/69 |
| 2009/0196275 | A1 * | 8/2009 | Damnjanovic | ........ H04W 28/06 370/345 |
| 2009/0217348 | A1 | 8/2009 | Salmela et al. | |
| 2011/0268026 | A1 * | 11/2011 | Ronneke | ........... H04W 72/1242 370/328 |

FOREIGN PATENT DOCUMENTS

KR 10-2009-0124979 A 12/2009

OTHER PUBLICATIONS

3GPP TS 22.368 V10.0.0 (Mar. 2010), "3rd Generation Partnership Project; Technical Specification Group Services and System Aspects; Service requirements for Machine-Type Communications (MTC); Stage 1 (Release 10)", Mar. 2010.

* cited by examiner

*Primary Examiner* — Bobbak Safaipour
(74) *Attorney, Agent, or Firm* — Jefferson IP Law, LLP (57) ABSTRACT

According to an embodiment of the present invention, a system access method for a user equipment performing machine-to-machine (M2M) communication with a system may include: awaiting, when the user equipment detects a need for system access, reception of access delay information from a base station for a preset delay information wait time; obtaining, when access delay information is received from the base station within the delay information wait time, an access delay time from the access delay information; and awaiting expiration of the access delay time while not attempting system access. Hence, system access attempts made by many M2M user equipments can be efficiently handled in the present invention.

10 Claims, 8 Drawing Sheets

METHOD AND APPARATUS FOR SYSTEM ACCESS

TECHNICAL FIELD

The present invention relates to a method and apparatus for system access.

BACKGROUND ART

Mobile communication systems may be categorized into first generation systems employing analogue technology, second generation systems employing digital technology, third generation systems providing IMT-2000 high speed multimedia services, and fourth generation systems providing ultra high speed multimedia services.

Figure 1:
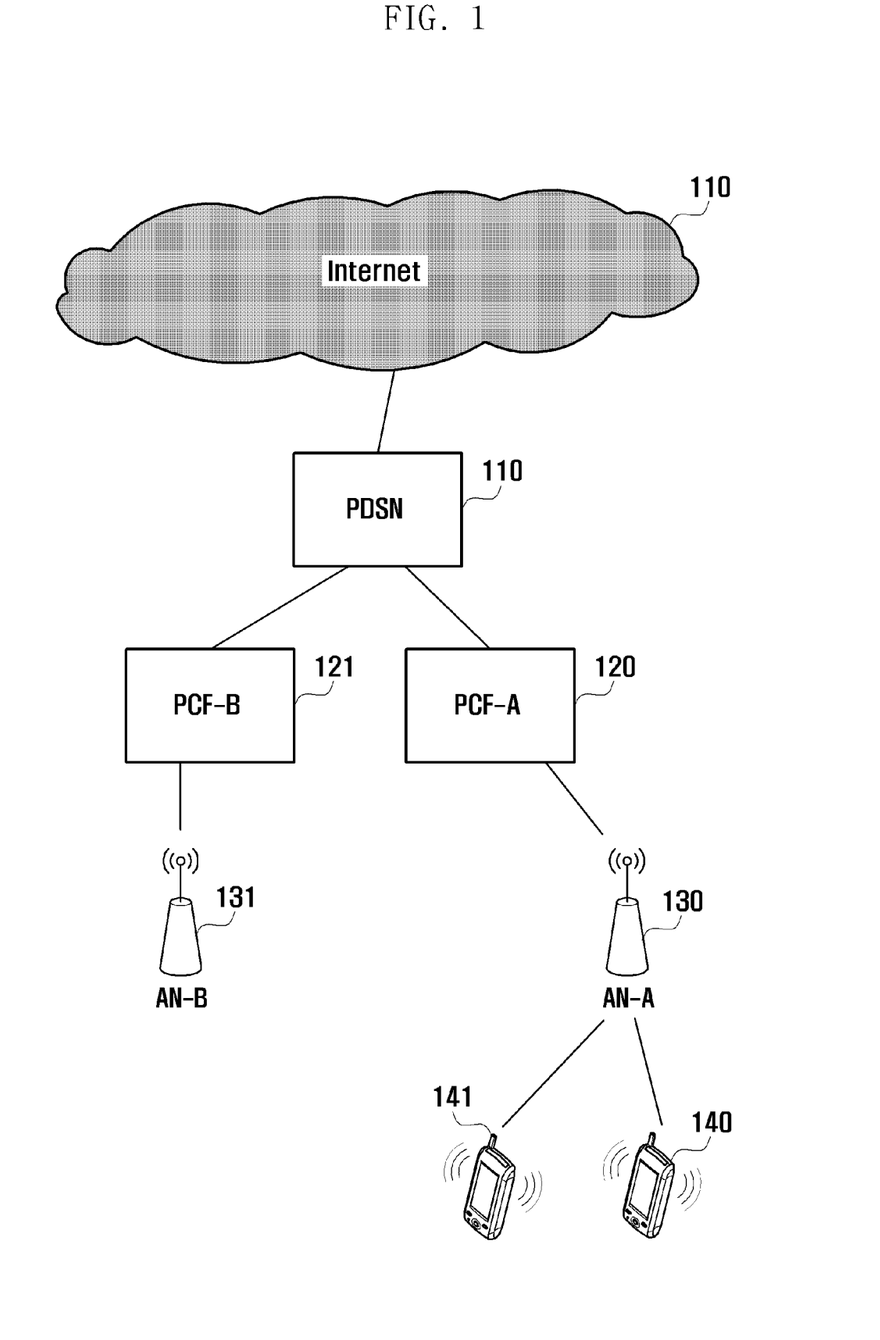
FIG. 1 illustrates the architecture of a typical HRPD system.

FIG. 1 illustrates the architecture of a typical HRPD system.

Among third generation mobile communication systems, the CDMA HRPD (high rate packet data) system and WCDMA HSPA (high speed packet data) system support channel structures for high-speed data transmission. The HRPD system is based on code division multiple access (CDMA) technology and is illustrated in FIG. 1. The HRPD system includes a packet data service node (PDSN) 110 that is connected to the Internet and sends high speed packet data to base stations 130 and 131, and packet control functions (PCF) 120 and 121 for controlling the base stations 130 and 131. The base station 130 wirelessly communicates with multiple user equipments 140 and 141, and sends high speed packet data to a user equipment at the highest data rate.

Figure 2:
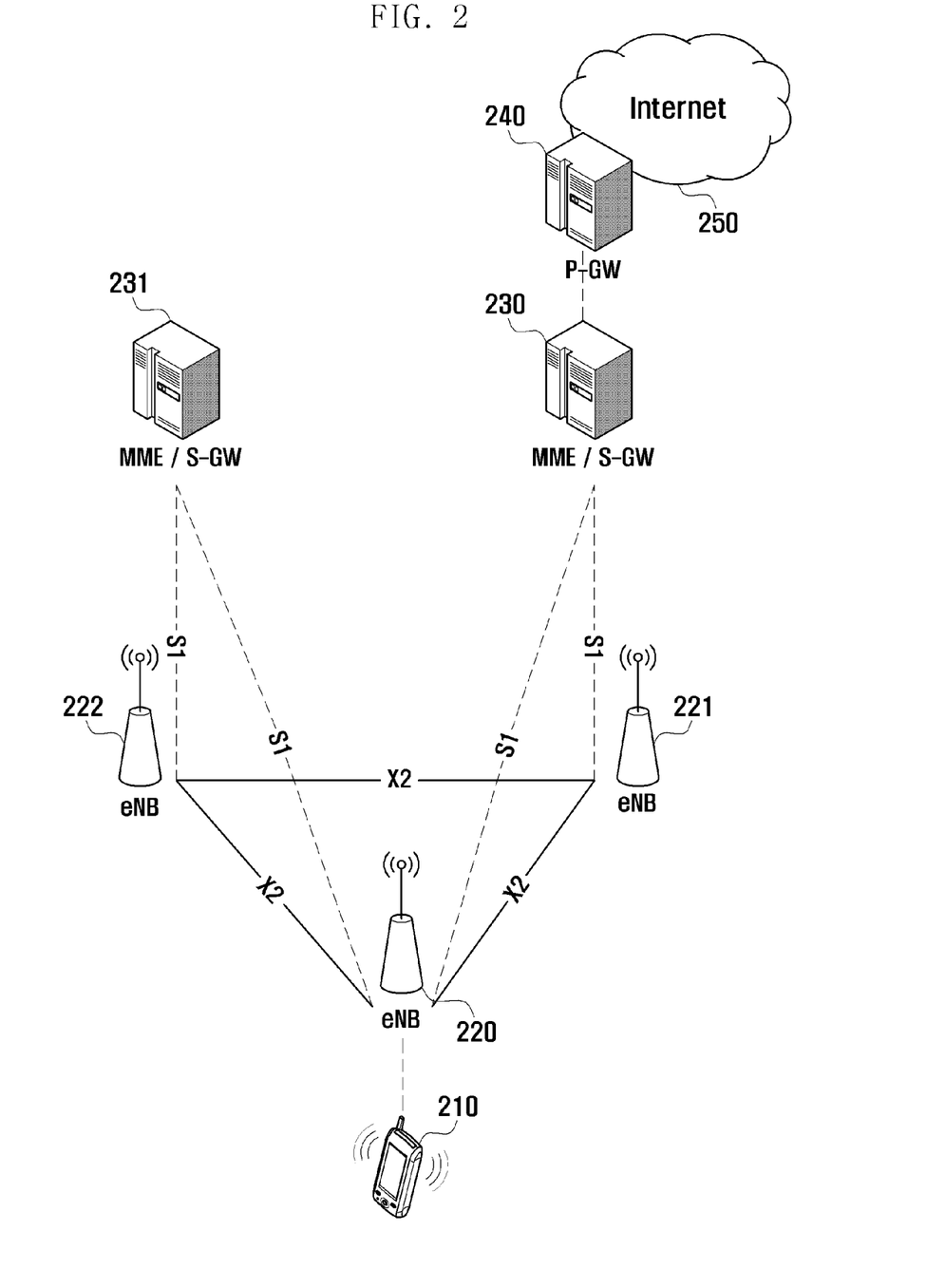
FIG. 2 illustrates the architecture of a typical LTE system.

FIG. 2 illustrates the architecture of a typical LTE system.

Fourth generation mobile communication systems, which have evolved from third generation systems like HRPD systems, aim for transmission speeds of 20 Mbps or more to provide ultra high speed multimedia services, and mainly use orthogonal frequencies based on orthogonal frequency division multiplexing (OFDM). A representative fourth generation mobile communication system is an LTE system or LTE-advanced system (having been standardized by 3GPP). Referring to FIG. 2, the LTE system includes base stations (eNBs) 220, 221 and 222 that wirelessly communicate with multiple user equipments 210 to provide ultra high speed multimedia services, MME/S-gateway (serving gateway) 230 and 231 that manages mobility, call processing and data transmission paths of user equipments, and a PDN gateway (packet data network gateway) 240 that is connected to the Internet 250 and sends high speed packet data via base stations to user equipments.

With recent advances in communication technology, various devices such as controllers, instruments and home appliances, which were not connected with communication systems in the past, are increasingly connected to wired or wireless communication systems. These devices connected with communication systems conduct metering or control operations without direct human intervention so as to increase efficiency and decrease maintenance costs.

Unlike conventional communication where humans are principal agents, communication occurring between devices (such as controllers, instruments and home appliances) and a communication system is referred to as machine-to-machine (M2M) communication. When M2M communication was first conceived for remote control or telematics in the early 1990s, the market was very narrow. Thereafter, M2M communication has rapidly advanced to such an extent as to create a worldwide market covering various fields including point-of-sale (POS) systems, fleet management for security applications, remote monitoring of machines and facilities, and smart metering of operating times or usage of heat or electricity of machines and facilities.

In the description, a user equipment (UE) or user terminal performing M2M communication is referred to as an M2M UE.

M2M UEs may have different characteristics in comparison to existing regular user equipments. Representative characteristics of M2M UEs are listed below.

1. M2M UEs such as controllers and measurement instruments do not move or move very infrequently.

2. Some M2M UEs send and receive data only in preset time durations.

3. Some M2M UEs may be tolerant of delay in data communication.

4. Some M2M UEs do not need a function for voice communication.

5. M2M UEs do not need paging from mobile communication systems, and may make attachment requests when data communication is necessary.

6. As various devices may support M2M communication, the number of M2M UEs may be much greater than that of regular UEs in regions where population density is high.

When a large number of M2M UEs make attempts for system access in a preset time duration owing to their characteristics described above, communication congestion that cannot be handled with congestion control schemes employed by existing mobile communication systems may be caused.

Figure 3:
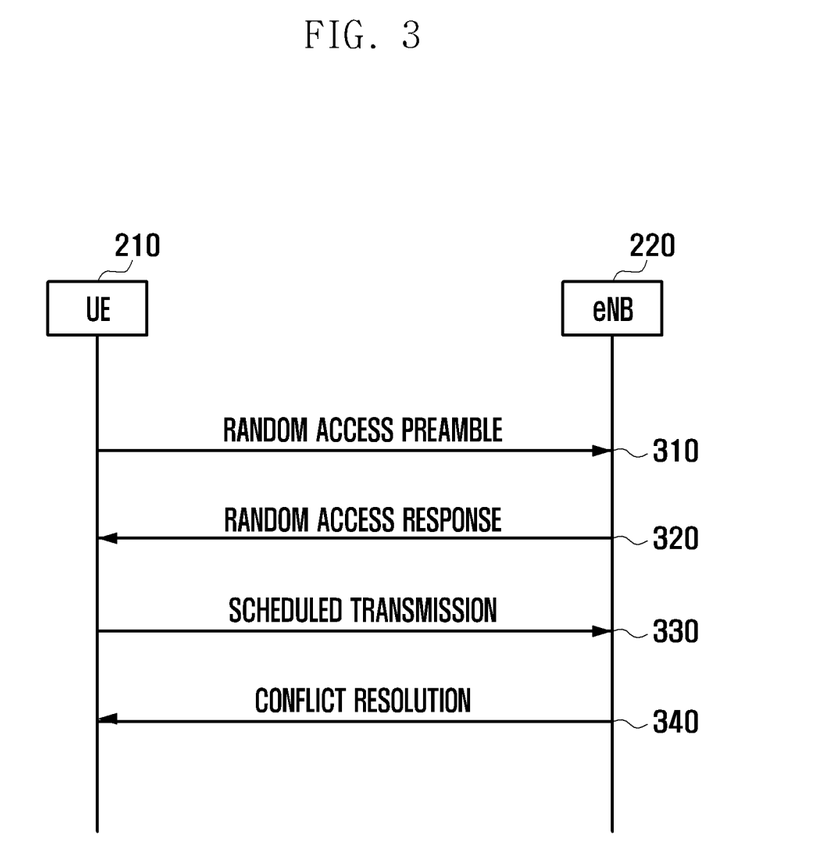
FIG. 3 is a sequence diagram illustrating an access procedure specified in the existing LTE system.

FIG. 3 is a sequence diagram illustrating an access procedure specified in an existing LTE system. A UE 210 having data or signaling data to be sent transmits a preamble (access request message) through system-specified access resources to a corresponding eNB 220 (310). Here, the preamble is selected from a number of preambles specified for the access procedure in consideration of channel states and the amount of data to be sent of the UE 210. Upon reception of the preamble, the eNB 220 sends a response message, which contains resource allocation information to be used for subsequent data transmission and a temporary identifier to be used for access, to the UE 210 (320). Upon reception of the response message, the UE 210 sends a control signal for connection establishment by use of resources indicated by the response message to the eNB 220 (330). When two different UEs make system access attempts using the same preamble at step 310, they may simultaneously make attempts for connection establishment at step 330 according to the message received at step 320. To resolve such contention, the eNB 220 sends a message containing a unique identifier of a selected UE to the UE 210 to thereby notify the UE 210 of selection (340).

In the access procedure of FIG. 3, when contention between different UEs frequently arises, the eNB 220 may configure access delay for UEs not selected at step 302. That is, when a UE receives a response message containing access delay information at step 320 (i.e., not selected by the eNB 220) after sending a preamble at step 310, the UE delays making a system access attempt for a given time. Here, the access delay time is randomly selected from a range indicated by the access delay information.

DISCLOSURE

Technical Problem

The present invention provides a method and apparatus that efficiently handle system access attempts made by multiple M2M UEs.

Technical Solution

In accordance with an exemplary embodiment of the present invention, there is provided a system access method for a user equipment performing machine-to-machine (M2M) communication with a system, including: awaiting, when the user equipment detects a need for system access, reception of access delay information from a base station for a preset delay information wait time; obtaining, when access delay information is received from the base station within the delay information wait time, an access delay time from the access delay information; and awaiting expiration of the access delay time while not attempting system access.

In accordance with another exemplary embodiment of the present invention, there is provided a system access method, including: receiving an access request from a user equipment performing machine-to-machine (M2M) communication with a system; and sending, when an access request is received from a user equipment not performing M2M communication while a system access procedure is being executed for the user equipment performing M2M communication, access delay information to the user equipment performing M2M communication and the user equipment not performing M2M communication. After reception of the access delay information, the user equipment performing M2M communication does not attempt system access for an access delay time.

In accordance with another exemplary embodiment of the present invention, there is provided a user equipment performing machine-to-machine (M2M) communication with a system, including: a front end receiving access delay information from a base station; and a controller awaiting, when a need for system access is detected, reception of access delay information for a preset delay information wait time, obtaining, when access delay information is received from the base station within the delay information wait time, an access delay time from the access delay information, and awaiting expiration of the access delay time while not attempting system access.

In accordance with another exemplary embodiment of the present invention, there is provided a base station, including: an RF unit receiving access requests from a user equipment performing machine-to-machine (M2M) communication with a system and a user equipment not performing M2M communication, and sending access delay information thereto; and a controller sending, when an access request is received from a user equipment not performing M2M communication while a system access procedure is being executed for a user equipment performing M2M communication, access delay information to the user equipment performing M2M communication and the user equipment not performing M2M communication. After reception of the access delay information, the user equipment performing M2M communication does not attempt system access for an access delay time.

Specific details of other embodiments are contained in the following detailed description and accompanying drawings.

Advantageous Effects

According to the present invention, system access attempts made by multiple M2M UEs can be efficiently handled.

BEST MODE

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention. Particular terms may be defined to describe the invention without limiting the subject matter of the present invention. Accordingly, the meaning of specific terms or words used in the specification and the claims should be construed in accordance with the spirit of the present invention.

Figure 4:
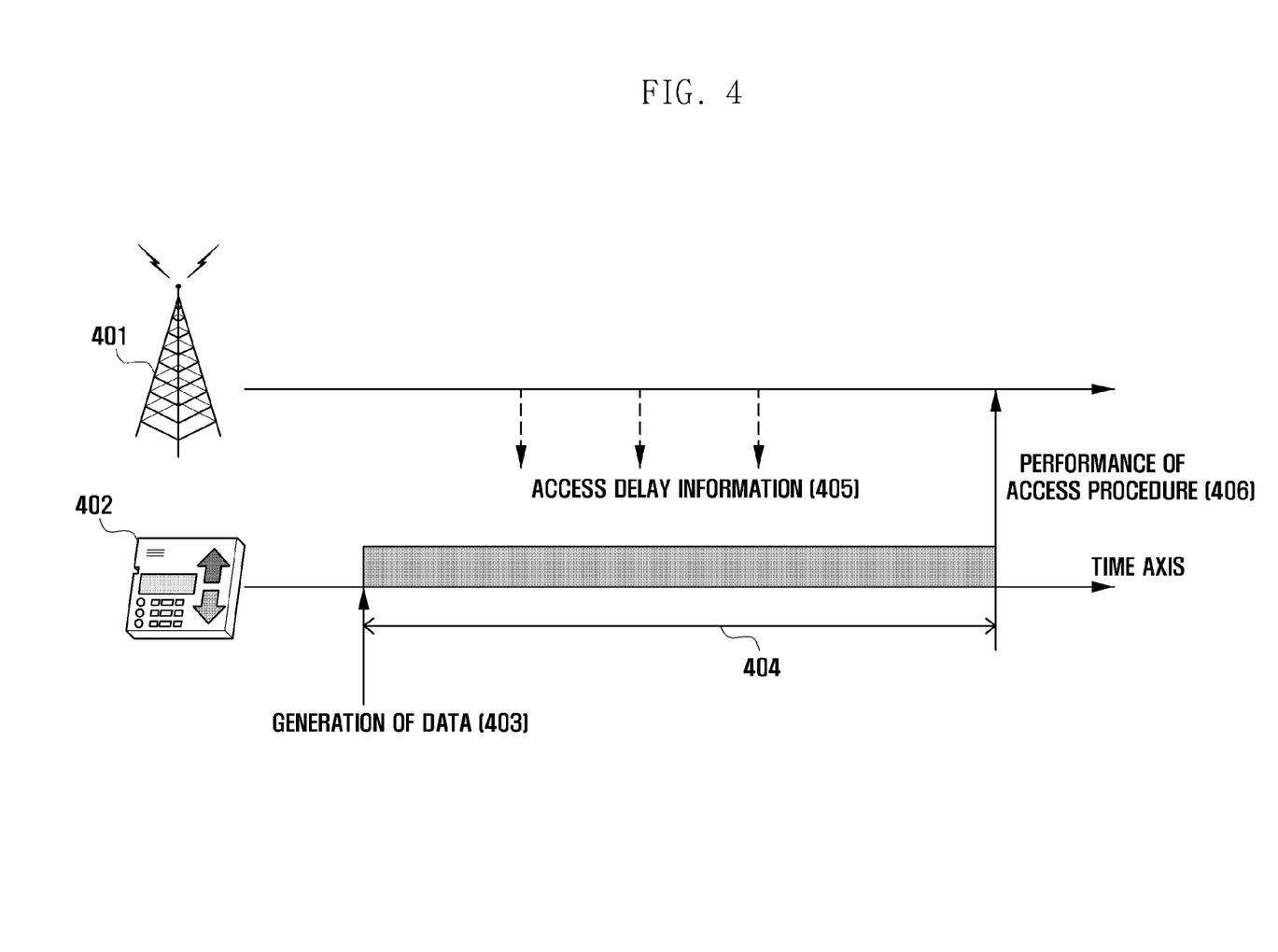
FIG. 4 illustrates a system access procedure according to a first embodiment of the present invention.

FIG. 4 illustrates a system access procedure according to a first embodiment of the present invention. FIG. 4 depicts a method proposed in the present invention to avoid congestion in system access by controlling system access of M2M UEs without disrupting communication of regular UEs (non-M2M UEs). The system of FIG. 4 includes an eNB 401 and an M2M UE 402. It is assumed that the M2M UE 402 has detected a need for system access according to generation of data at a specific time 403. In this case, the M2M UE 402 does not immediately perform the access procedure as in the related art technique but attempts to receive access delay information 405 from the eNB 401 during a given time duration 404. When the M2M UE 402 fails to receive access delay information 405, it perform the access procedure at a specific time 406 after expiration of the given time duration 404. In the following description, the time duration for an M2M UE 402 to wait for access delay information 405 without performing the access procedure after the data generation time 403 is referred to as "delay information wait time".

In the present invention, the eNB may use broadcast messages to notify all M2M UEs of the same delay information wait time 404. The eNB may use unicast messages to notify individual M2M UEs of different delay information wait times 404. A pre-agreed time value may be used as the delay information wait time 404 without message exchange between the eNB and M2M UE.

Figure 5:
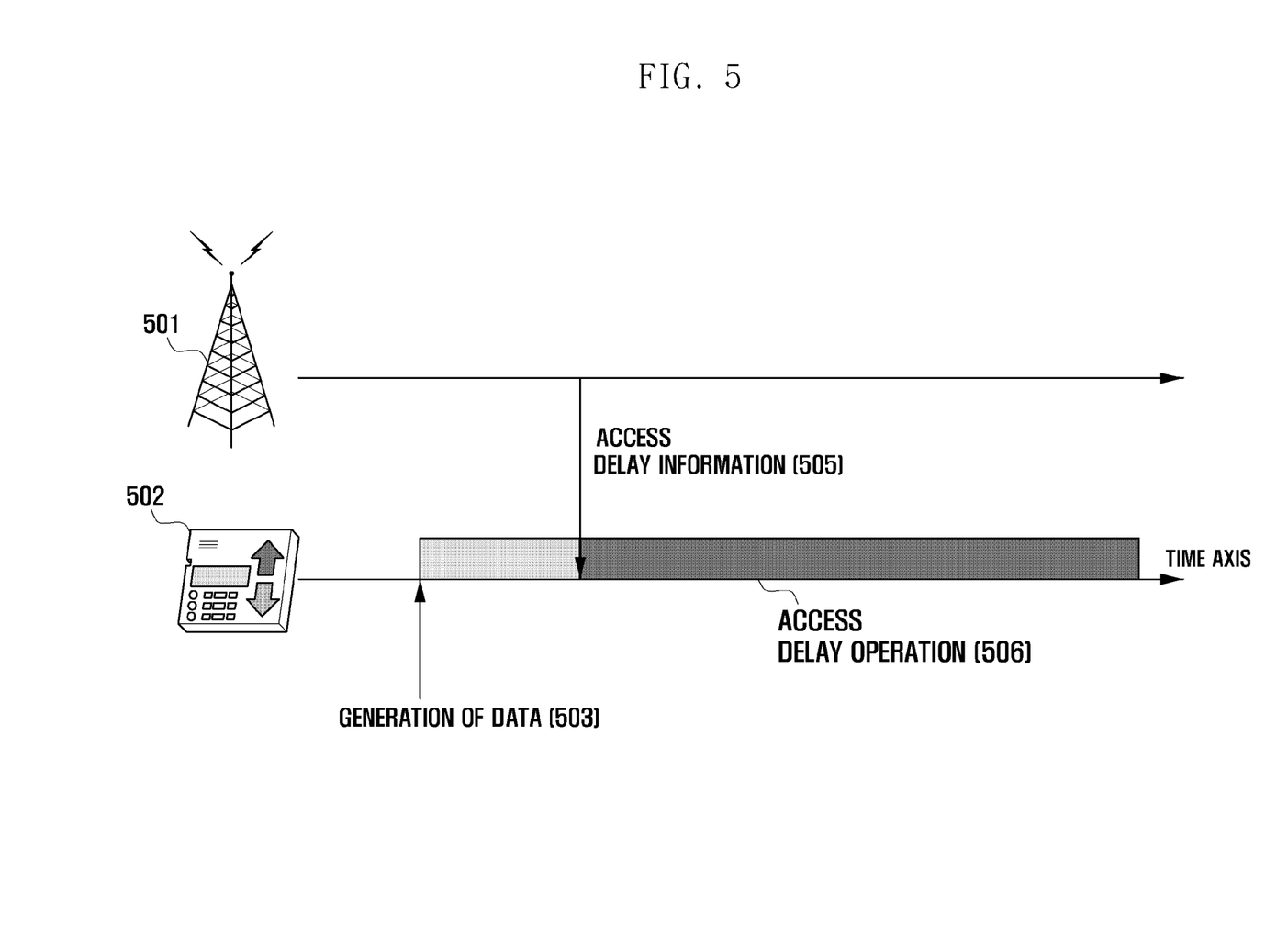
FIG. 5 illustrates a system access procedure according to a second embodiment of the present invention.

FIG. 5 illustrates a system access procedure according to a second embodiment of the present invention. FIG. 5 depicts a situation in which an M2M UE 502 has received access delay information 505 during the delay information wait time in the access procedure as described in FIG. 4. When the M2M UE 502 receives access delay information 505 from an eNB 501, it does not attempt system access for a given time 506. Here, the given time 506 during which system access is not attempted is set to an access delay time indicated by the access delay information 505 or to a time value randomly selected within the access delay time.

In the present invention, the access delay information 505 may be notified to individual M2M UEs through broadcast or unicast messages indicating specific delay times. When an M2M UE 502 receives a message indicating a delay time from the eNB 501, it does not attempt system access for the indicated delay time or for a time randomly selected within the indicated delay time.

As another embodiment for delivering access delay information, when an M2M UE 502 receives an access response message indicating an access delay time for a regular UE, which was sent by the eNB 501 in response to an access request message from the regular UE, the M2M UE 502 may use the indicated access delay time as access delay information. Here, the M2M UE 502 may ignore the access delay time intended for a regular UE, and may not attempt system access for a time pre-agreed with the eNB or for a time randomly selected within the pre-agreed time.

As another embodiment for delivering access delay information, when an M2M UE 502 receives an access delay time intended for a regular UE, the M2M UE 502 may use a result value obtained by applying a function to the received access delay time as access delay information. Here, the M2M UE 502 may not attempt system access for a time corresponding to the result value obtained by function application or for a time randomly selected within the corresponding time. The function, taking an access delay time intended for a regular UE as input, may multiply or add the input and a preset value to produce a result value.

As another embodiment for delivering access delay information, when an M2M UE 502 receives an access delay time intended for a regular UE and the access delay time is set to a preset value, the M2M UE 502 may use the received access delay time as access delay information. For example, when the access delay time intended for a regular UE is set to a preset value of 0 ms, the M2M UE 502 may recognize the received access delay time as access delay information, and may not attempt system access for a time pre-agreed with the eNB or for a time randomly selected within the pre-agreed time.

Figure 6:
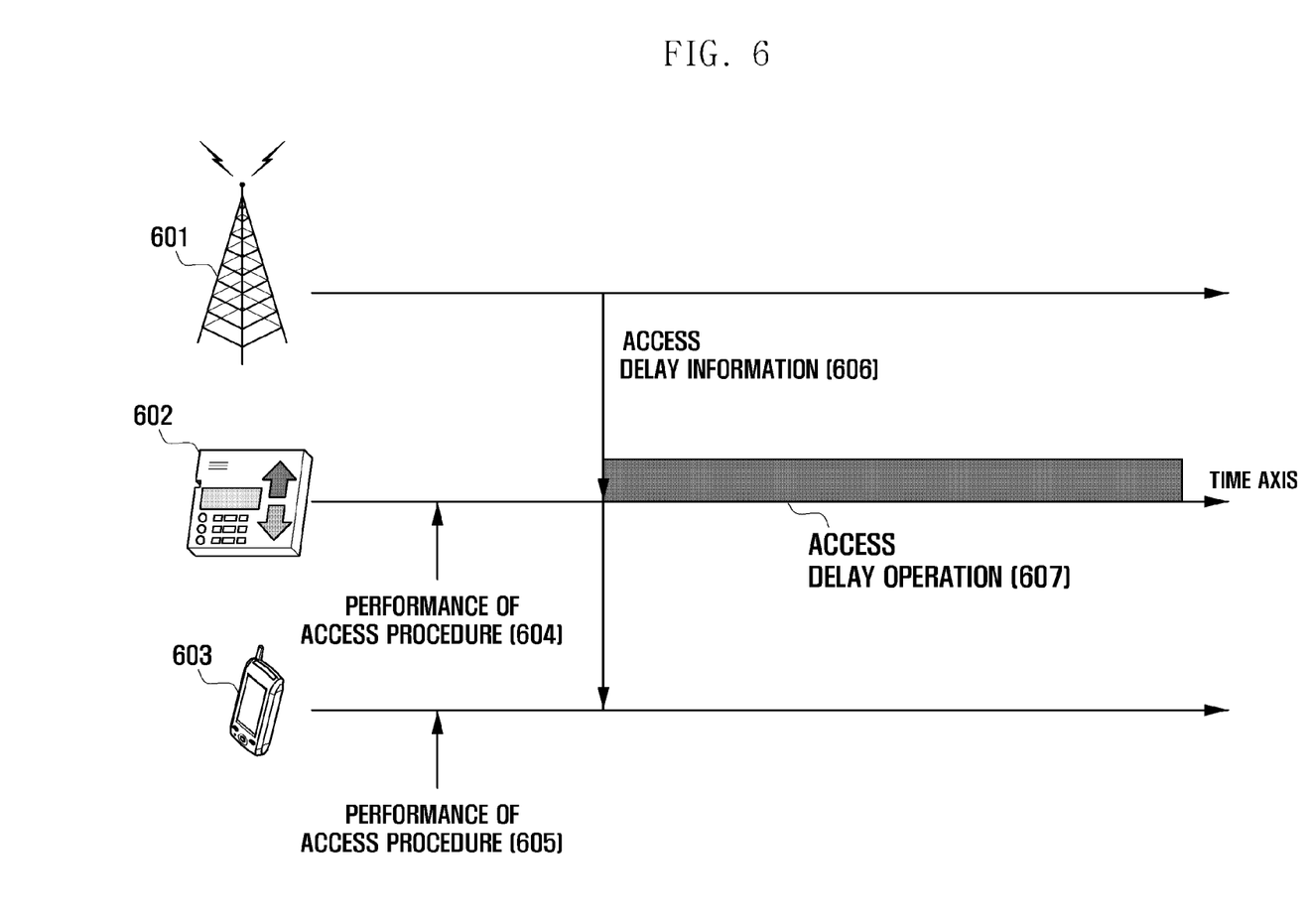
FIG. 6 illustrates a system access procedure according to a third embodiment of the present invention.

FIG. 6 illustrates a system access procedure according to a third embodiment of the present invention. FIG. 6 depicts a situation where an M2M UE 602 performing the access procedure is selectively controlled without disrupting a regular UE 603 performing the access procedure. An eNB 601 may send access delay information 606 to the M2M UE 602 and regular UE 603 performing the access procedure. Upon reception of the access delay information 606, the M2M UE 602 does not attempt system access for a given time 677 according to the access delay information 606; but the regular UE 603 ignores the access delay information 606.

In the present invention, the access delay information 606 may be delivered through a message understood only by an M2M UE 602.

Alternatively, the access delay information 606 may be delivered by use of one of access delay indexes originally defined for a regular UE 603.

TABLE 1

| Index | Backoff parameter value (ms) |
| --- | --- |
| 0 | 0 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | Reserved |
| 14 | Reserved |
| 15 | Reserved |

Table 1 illustrates access delay indexes and corresponding access delay times applied to regular UEs 603. When the eNB 601 sends a signal containing an access delay index, the M2M UE 602 or regular UE 603 may obtain an access delay time corresponding to the access delay index on the basis of the information provided in Table 1. In one embodiment, the indexes 13, 14 and 15 reserved for the future may be used to notify access delay times to M2M UEs 602. When an M2M UE 602 receives one of the indexes 13, 14 and 15, it does not attempt system access for a time randomly selected within the time corresponding to the received index or within a time pre-agreed with the eNB 601. On the other hand, when a regular UE 603 receives one of the indexes 13, 14 and 15, it may ignore the received index and may immediately attempt system access.

In another embodiment, the index of 0 indicating an access delay time of 0 ms in Table 1 may be used to notify access delay information to an M2M UE 602. That is, when an M2M UE 602 receives an index value of 0, it does not attempt system access for a time pre-agreed with the eNB 601 or for a time randomly selected within the pre-agreed time. On the other hand, when a regular UE 603 receives an index value of 0, it may regard the index value of 0 as an access delay time of 0 ms and may immediately attempt system access.

Figure 7:
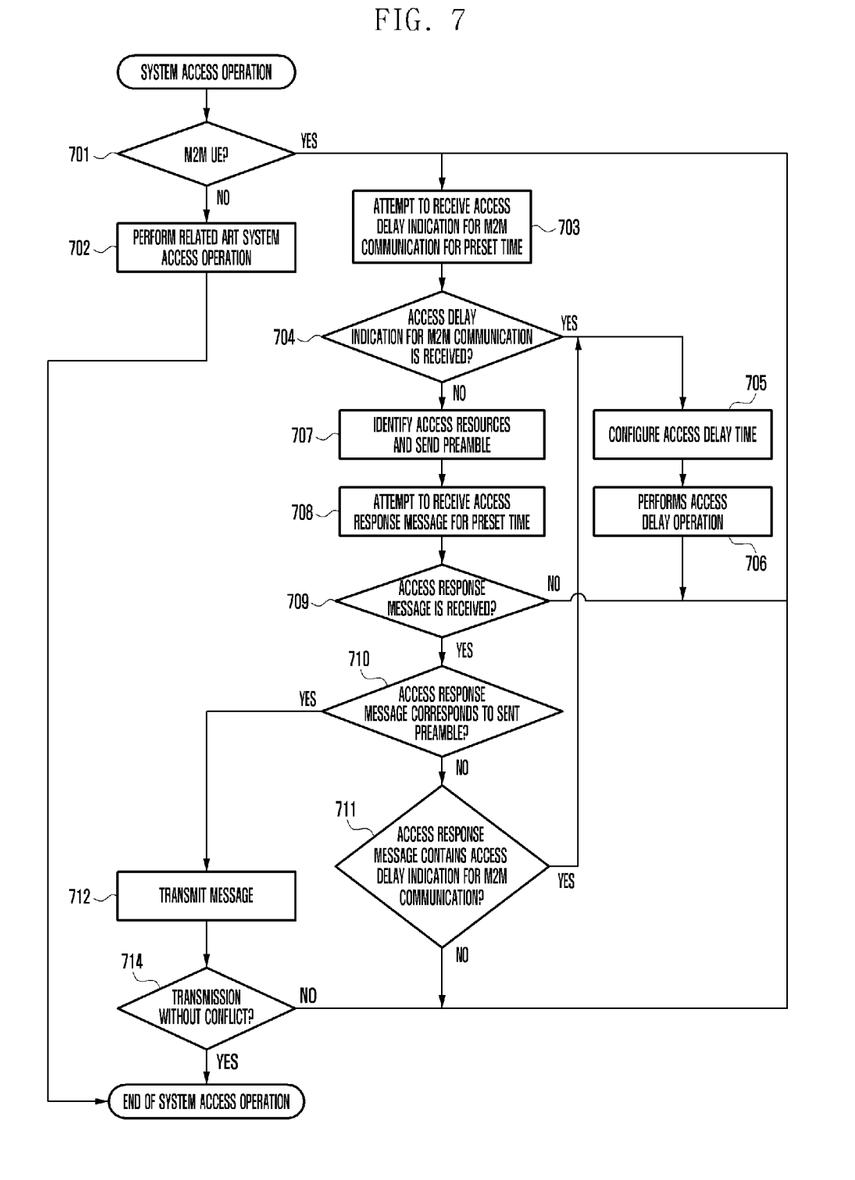
FIG. 7 is a flowchart of an access procedure performed by a UE according to an embodiment of the present invention.

FIG. 7 is a flowchart of an access procedure performed by a user equipment according to an embodiment of the present invention. The user equipment checks whether it is an M2M UE (701). When it is not an M2M UE, the user equipment (regular UE) performs related art system access operation (702). When it is an M2M UE, the user equipment attempts to receive access delay information for M2M communication during a preset delay information wait time (703). When access delay information is successfully received within the delay information wait time, the user equipment sets an access delay time as described before in connection with FIGS. 4 to 6 (705), and performs access delay operation by not attempting system access for the access delay time (706). After access delay operation, the user equipment returns to step 703 and continues to receive access delay information during the delay information wait time.

When access delay information is not received within the delay information wait time at step 704, the user equipment being an M2M UE identifies available access resources and sends a randomly selected preamble as an access request through the available access resources (707). The user equipment attempts to receive an access response message corresponding to the preamble for a preset time (708). When an access response message is not received during the preset time, the user equipment returns to step 703 and newly initiates the access procedure. When an access response message is received during the preset time, the user equipment checks whether the access response message corresponds to the sent preamble (710). When the access response message corresponds to the sent preamble, the user equipment sends a message needed for connection establishment (712). Thereafter, the user equipment checks whether there is contention with another user equipment (714). When there is a contention and a different user equipment is selected, the user equipment returns to step 703 and newly initiates the access procedure.

When the access response message does not correspond to the sent preamble at step 710, the user equipment checks whether the access response message contains access delay information for M2M communication as described before in connection with FIGS. 4 to 6 (711). When the access response message contains access delay information for M2M communication, the user equipment sets an access delay time as described before in connection with FIGS. 4 to 6 (705), and performs access delay operation by not attempting system access for the access delay time (706). After access delay operation, the user equipment returns to step 703 and newly initiates the access procedure.

When the access response message does not contain access delay information for M2M communication at step 711, the user equipment returns to step 703 and newly initiates the access procedure.

Figure 8:
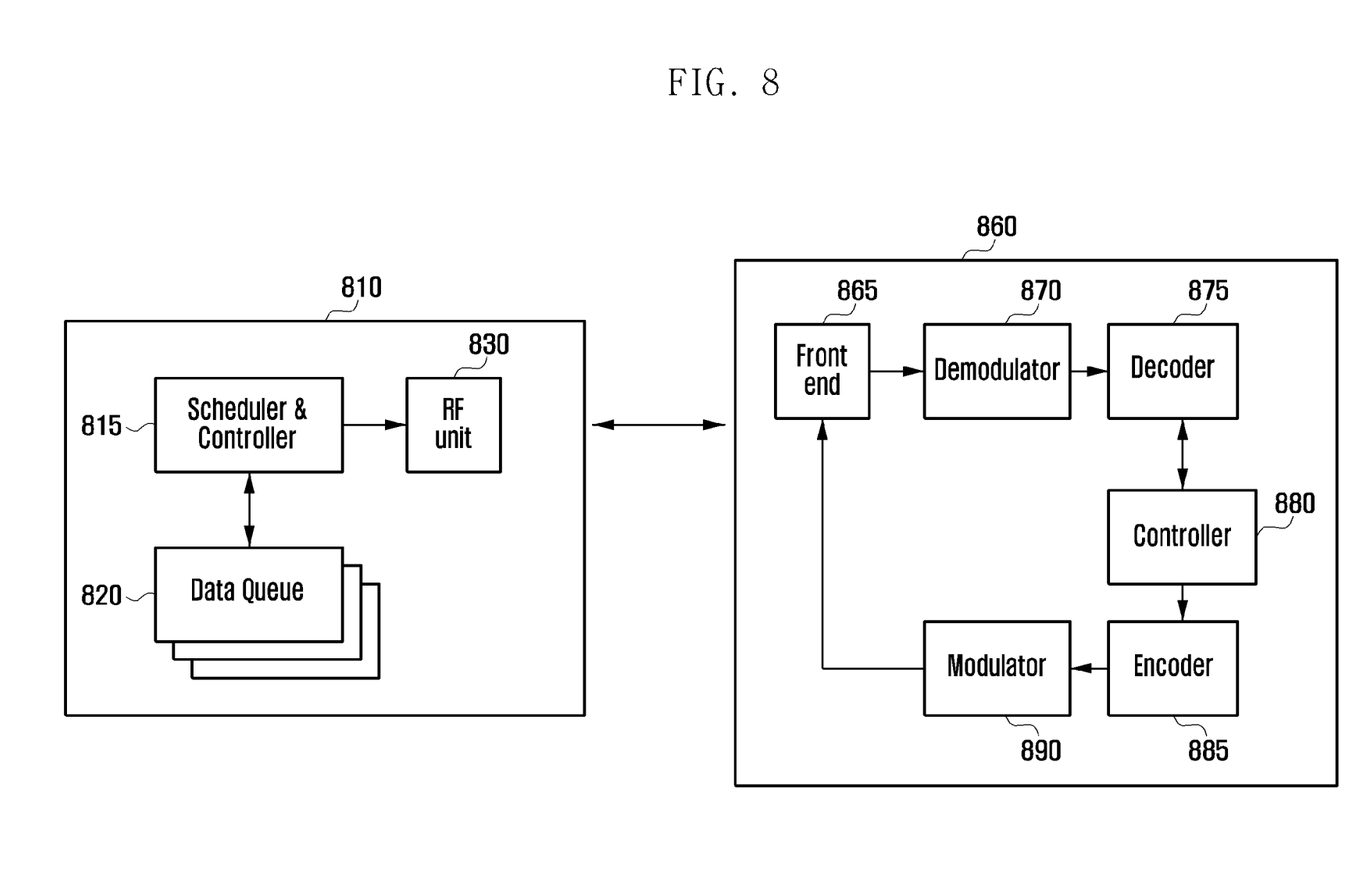
FIG. 8 is block diagrams of an M2M UE 860 and an eNB 810 according to an embodiment of the present invention.

FIG. 8 is block diagrams of an M2M UE 860 and an eNB 810 according to an embodiment of the present invention.

FIG. 8 illustrates configurations of an M2M UE and an eNB designed to avoid congestion in system access by controlling M2M UE system access without disrupting communication of regular UEs.

The eNB 810, which controls system access operation of UEs according to the schemes proposed in the present invention, includes a scheduler and controller 815, an RF unit 830, and data queues 820. The M2M UE 860, which performs access delay operation according to the schemes proposed in the present invention, includes a front end 865, a demodulator 870, a decoder 875, a controller 880, an encoder 885, and a modulator 890.

In the eNB 810, when the congestion level for system access is above a threshold level, the scheduler and controller 815 may control system access attempts made by M2M UEs so that a preset time is maintained between successive system access attempts. Such control operation is performed by transmitting access delay information. As described before in connection with FIGS. 4 to 6, the access delay information may be delivered to M2M UEs via separate broadcast or unicast messages indicating specific access delay times or via access delay information intended for regular UEs.

The data queues 820 of the eNB 810 stores data received from a higher level network node according to UEs or services. The scheduler and controller 815 selectively controls data stored in the data queues 820 or user data in consideration of downlink channel states of UEs, service characteristics and fairness. The scheduler and controller 815 generates access delay information and sends the access delay information through the RF unit 830 to the M2M UE 860. The RF unit 830 sends data or control signals to the M2M UE 860.

In the M2M UE 860, the controller 880 attempts to receive access delay information from the eNB 810 during a preset delay information wait time as described before in connection with FIGS. 4 to 6 and, when access delay information is received within the delay information wait time, does not attempt system access for the indicated access delay time as described in connection with FIGS. 4 to 6. In addition, after access initiation, the controller 880 checks whether an access response message received in response to an access request contains access delay information for the M2M UE 860 and, when the received access response message contains access delay information, does not attempt system access for the indicated access delay time as described in connection with FIGS. 4 to 6.

The front end 865 of the M2M UE 860 receives access delay information from the eNB 810.

It is known to those skilled in the art that blocks of a flowchart and a combination of flowcharts may be represented and executed by computer program instructions. These computer program instructions may be loaded on a processor of a general purpose computer, a special computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

INDUSTRIAL APPLICABILITY

The description of the various embodiments is to be construed as exemplary only and does not describe every possible instance of the invention. Therefore, it should be understood that various changes may be made and equivalents may be substituted for elements of the invention.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

DESCRIPTION OF REFERENCE SYMBOLS 141, 140, 210: user equipment (UE)
220: base station (eNB)
401, 501, 601, 810: base station
402, 502, 602, 860: M2M UE
603: regular UE

The invention claimed is:

1. A system access method for a user equipment performing machine-to-machine (M2M) communication with a system, comprising:
   identifying whether data to be transmitted to a base station is detected;
   awaiting, if the data is detected, reception of access delay information during a preset wait time;
   performing, if the access delay information is not received from the base station within the preset wait time, an access procedure;
   obtaining, if the access delay information is received from the base station within the preset wait time, an access delay time from the access delay information and
   delaying, if the access delay information is received from the base station within the preset wait time, the access procedure until expiration of the access delay time.

2. The system access method of claim 1 wherein obtaining an access delay time from the access delay information comprises utilizing, if the access delay information contains an access delay index of 0, a preset time or a time randomly selected within the preset time as the access delay time.

3. A system access method, comprising:
   receiving an access request from a user equipment performing machine-to-machine (M2M) communication with a system;
   performing an access procedure based on the request; and
   transmitting, if an access request is received from a user equipment not performing M2M communication while the access procedure is being executed for the user equipment performing M2M communication, access delay information to the user equipment performing M2M communication and the user equipment not performing M2M communication,
   wherein the access procedure is delayed until expiration of an access delay time obtained from the access delay information after reception of the access delay information.

4. The system access method of claim 3, wherein transmitting access delay information comprises transmitting access delay information containing an access delay index set to 0.

5. The system access method of claim 3, wherein transmitting access delay information comprises transmitting access delay information containing an access delay index set to a pre-agreed value that is known to the user equipment performing M2M communication but is not known to the user equipment not performing M2M communication.

6. A user equipment performing machine-to-machine (M2M) communication with a system, comprising:
   a transceiver configured to transmit and receive a signal; and
   a controller configured to:
      identify whether data to be transmitted to a base station is detected,
      await, if the data is detected, reception of access delay information during a preset wait time,
      perform, if the access delay information is not received from the base station within the preset wait time, an access procedure to the system,
      obtain, if the access delay information is received from the base station within the preset wait time, an access delay time from the access delay information, and
      delay, if the access delay information is received from the base station within the preset wait time, the access procedure based on until expiration of the access delay time.

7. The user equipment of claim 6 wherein the controller utilizes, if the access delay information contains an access delay index of 0, a preset time or a time randomly selected within the preset time as the access delay time.

8. A base station comprising:
   a transceiver configured to transmit and receive a signal; and
   a controller configured to:
      receive an access request from a user equipment performing machine-to-machine (M2M) communication with a system,
      perform an access procedure based on the request, and
      transmit, if an access request is received from a user equipment not performing M2M communication while the access procedure is being executed for a user equipment performing M2M communication, access delay information to the user equipment performing M2M communication and the user equipment not performing M2M communication,
   wherein the access procedure is delayed until expiration of an access delay time obtained from the access delay information after reception of the access delay information.

9. The base station of claim 8, wherein the controller transmits access delay information containing an access delay index set to 0 to the user equipment performing M2M communication and the user equipment not performing M2M communication.

10. The base station of claim 8, wherein the controller transmits access delay information containing an access delay index set to a pre-agreed value that is known to the user equipment performing M2M communication but is not known to the user equipment not performing M2M communication.

* * * * *